United States Patent [19]

Cherdron et al.

[11] Patent Number: 5,039,779

[45] Date of Patent: Aug. 13, 1991

[54] THERMOPLASTICALLY PROCESSIBLE AROMATIC POLYETHERAMIDE FROM 2,2-BIS(4'-AMINO PHENOXY PHENYL) PROPANE AND TEREPHTHALIC ACID

[75] Inventors: Harald Cherdron, Wiesbaden; Hellmuth Deckers, Ingelheim; Friedrich Herold, Hofheim am Taunus; Reiner Hess, Wiesbaden, all of Fed. Rep. of Germany

[73] Assignee: Hoechst Aktiengesellschaft, Frankfurt am Main, Fed. Rep. of Germany

[21] Appl. No.: 358,180

[22] Filed: May 26, 1989

[30] Foreign Application Priority Data

May 28, 1988 [DE] Fed. Rep. of Germany ....... 3818209

[51] Int. Cl.$^5$ .................................. C08G 69/32
[52] U.S. Cl. ................................ 528/185; 528/183; 528/191; 528/348
[58] Field of Search ............... 528/185, 183, 348, 191

[56] References Cited

U.S. PATENT DOCUMENTS 4,278,786  7/1981  Nanaumi et al. ................... 528/185

FOREIGN PATENT DOCUMENTS 0081360  7/1981  Japan ................................. 528/185
6091304  7/1981  Japan ................................. 528/185
0246658  12/1985 Japan ................................. 528/185

*Primary Examiner*—Harold D. Anderson

[57] ABSTRACT

A thermoplastically processible aromatic polyetheramide, in which the structure comprises the repeating units of the formulae

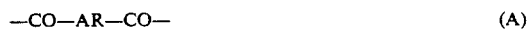

—CO—AR—CO—   (A)

and

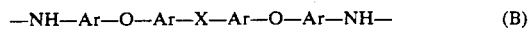

—NH—Ar—O—Ar—X—Ar—O—Ar—NH—   (B)

in which Ar signifies a bivalent unsubstituted or substituted aromatic radical having 6 carbon atoms, and whose linkages are in the p-position and X denotes a 2,2-propylidene linkage, the polyetheramide having an intrinsic viscosity [$\eta$] in the range of 50 to 750 cm$^3$/g, and a glass transition temperature of above 200° C., and a process for its production. The production of the polyetheramide is carried out by a low temperature solution condensation process, a solid phase condensation process, an interfacial condensation process or a melt condensation process.

The polyetheramide is used for the production of molded articles in the form of filaments, wires, films and other moldings, which are produced by extrusion, press-molding or injection molding of the dry polyetheramide in powder form or by processing of solutions of the polyetheramide.

6 Claims, No Drawings

THERMOPLASTICALLY PROCESSIBLE AROMATIC POLYETHERAMIDE FROM 2,2-BIS(4'-AMINO PHENOXY PHENYL) PROPANE AND TEREPHTHALIC ACID

DESCRIPTION

The invention relates to thermoplastically processible aromatic polyetheramides, their production by low temperature solution condensation, interfacial condensation or melt condensation, articles formed from them such as moldings, films, wires and filaments as well as possible applications. The polymers according to the invention have in these instances excellent properties, can be produced from easily accessible monomers and can be thermoplastically processed or formed without problems. Where properties are concerned, the high mechanical properties, particularly the high initial modulus and a high glass transition temperature and thereby excellent heat stability are particularly advantageous.

Aromatic polyamides are known for their excellent thermal, chemical and mechanical properties.

Although predominantly p-linked homopolymers such as poly-p-phenyleneterephthalamide (PPTA) made from p-phenylenediamine (PPD) and terephthaloyl dichloride (TPC) have very high mechanical properties, these decompose below their melting point and because of their low solubility in organic solvents they must be processed from concentrated sulfuric acid (two-step process, corrosion problems), (DE-OS 2 219 703). The cause is to be found in the very rigid chain character of these polymers.

A remedy is initially offered by copolymers based on PPTA, the processing in organic solvents, among other ways being achieved by the incorporation of flexible groups, the polymers decomposing below the melting point however, like PPTA. In this case, 3,4'-diaminodiphenyl ether (3,4'-ODA) or 1,4-bis(4'-aminophenoxy)benzene (BAPOB) are for example suitable as comonomers (EP-B 0,045,934 or EP-A 0,199,090). Although attempts to press-mold copolyamides of this type, for example in the case of polymers with 3,4'-ODA, do produce moldings, the conventional methods of thermoplastic processing or a subsequent forming process cannot be used (JP 61/264 022-A).

Although transferring to systems made from m-phenylene-diamine (MPD) and isophthaloyl dichloride (IPC) produces polymers with still greater solubility, here also decomposition occurs below the melting point (U.S. Pat. No. 3,063,966). Press-molding of these aromatic polyamides produces moldings with the same disadvantages as above, the mechanical properties being moreover at a relatively low level (EP-A 0,198,167 and EP-A 0,200,472).

Fusible polyaramides are only obtained when still more flexible components are incorporated. The problem here is the narrow discretionary range between thermoplastic processibility, i.e. an adequate interval between the necessary processing temperature and the decomposition temperature, and remaining high mechanical properties, since high values for the initial modulus are based on a polymer structure of maximum rigidity, and thus as far as possible, p-linking. Moreover, the required heat stability limits the use of components to those which are predominantly aromatic, since incorporation of aliphatic groups leads to a diminished heat resistance (U.S. Pat. No. 4,072,665 and U.S. Pat. No. 4,087,481).

2,2-bis(4'-Aminophenoxyphenyl)propane (BAP) is a predominantly aromatic, relatively flexible and easily accessible monomer often used for the production of aromatic polyetheramides, and which is preferably synthesized from the products bisphenol A and p-chloronitro-benzene which are available on an industrial scale.

Fusible polyetheramides based on IPC and BAP are also known (U.S. Pat. No. 3,505,288, Examples 2 and 4). The high proportion of m-structures and a correspondingly relatively low level of mechanical properties, particularly of the initial modulus, are apparent disadvantages. Polymers made from TPC and BAP (Example 5) are described as not fusible with a decomposition point of 350° C.

An improvement in relation to the fusibility and the mechanical properties is achieved by means of polymers made from an aromatic diamine and an aromatic dicarbonyl dihalide, preferably however from BAP and IPC/TPC mixtures (DE-A 2,636,379).

Polymers made from IPC and BAP/MPD mixtures are also known from a publication (U.S. Pat. No. 4,410,684). Compositions are described here in which the major component, i.e. comprising more than 50 mol %, is MPD. No assertion is made concerning TPC in this publication.

The concept of the latter two publications mentioned is based on the incorporation or on the use of m-structures, which lead to lower glass transition temperatures and initial moduli. It has not been disclosed however that the polymer made from BAP and TPC has particularly valuable properties.

The object of the invention is to develop thermoplastically processible aromatic polyetheramides, which have high mechanical properties. This particularly concerns the initial modulus and a high glass transition temperature, i.e. an excellent heat resistance should be made possible.

The invention relates to a thermoplastically processible aromatic polyetheramide, in which the structure comprises the repeating units of the formulae

  (A)

and

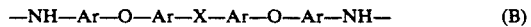  (B)

in which Ar signifies a bivalent unsubstituted or substituted aromatic radical having 6 carbon atoms, and whose linkages are in the p-position and X denotes a 2,2-propylidene linkage, wherein the polyetheramide has an intrinsic viscosity [$\eta$] in the range of 50 to 750 cm$^3$/g and a glass transition temperature of above 200° C.

The production of the polymers can be carried out by conventional condensation techniques such as low temperature solution condensation, solid phase condensation, interfacial condensation or melt condensation.

Surprisingly, these aromatic polyetheramides can be processed well thermoplastically, for example by press-molding into moldings, extrusion or injection molding, and have unexpectedly excellent properties. The processing to moldings, films and wires is naturally preferably carried out via melt processes, but films, filaments and wires can also be obtained via solution processes.

The following compounds are suitable for the production of the polyetheramides according to the invention:

Dicarboxylic acid derivatives of the formula

W—CO—Ar—CO—W　　(A')

in which —Ar— represents a bivalent radical as described above and W depending in each case on the condensation technique selected, a halogen, preferably chlorine, or an —OH group or —OR group, R signifying a branched or unbranched aliphatic radical having 1–4 carbon atoms in the alkyl group or an aromatic radical, for example terephthaloyl dichloride, 2-chloroterephthaloyl dichloride, terephthalic acid or diphenyl terephthalate. 2,2-bis(4'-Aminophenoxyphenyl)propane is preferably suitable as aromatic diamine of the formula

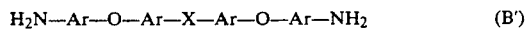

H₂N—Ar—O—Ar—X—Ar—O—Ar—NH₂　　(B')

in which —Ar— and —X— have the meaning given above.

The condensation is preferably carried out by a conventional low temperature solution process.

This solution condensation of the aromatic dicarbonyl dichloride with the aromatic diamine is carried out in aprotic, polar solvents of the amide type, for example in N,N-dimethylacetamide or particularly in N-methyl-2-pyrrolidone (NMP). Optionally halide salts of the first and/or second group of the periodic table can be added to these solvents in a known manner in order to increase the solvent power or to stabilize the polyetheramide solutions. Preferred additives are calcium chloride and/or lithium chloride. The aromatic polyetheramides described are indeed exceptional in having a high solubility in the above solvents of the amide type, so that preferably the condensation is carried out without addition of salt. The starting compounds (A') and (B') are generally used in equimolar quantities. Usually the quantity of dicarbonyl dichloride is selected in such a way that the solution viscosity is a maximum, i.e. depending on the monomer purity in each case slightly more or less than 100 mol % are added.

The polycondensation temperatures are between 10° and 100° C. Particularly good results are obtained at reaction temperatures between 10° and 80° C. The polycondensation reactions are carried out in such a way that after completion of the reaction 2 to 40, preferably 3 to 30% by weight of polycondensate is present in the solution. For particular applications the solution can be diluted as required with N-methyl-2-pyrrolidone or with other amide solvents.

The polycondensation can be stopped in the conventional manner for example by the addition of monofunctional compounds, such as acetyl chloride, substituted benzoyl chlorides, for example p-chlorobenzoyl chloride, preferably however benzoyl chloride, and the use of monofunctional amines, for example aniline, N,N-dimethyl-p-phenylenediamine or 3-chloroaniline is equally suitable for limiting the molecular weight.

After conclusion of the polycondensation, i.e. when the polymer solution has reached the viscosity required for further processing, the hydrogen halide which has been generated and loosely bound to the amide solvent is neutralized by the addition of basic substances. Lithium hydroxide, calcium hydroxide, preferably however calcium oxide are suitable for example for this. Afterward the mixture is generally given an aftertreatment for 50 to 120 minutes at 50° to 80° C. in order to obtain the desired physical properties of the polymers. In order to produce shaped formations according to the invention the polyamide solutions according to the invention described above are filtered, degassed and further processed in a known manner and as subsequently described.

Suitable quantities of additives may be added to the solutions. Examples are light stabilizers, antioxidants, flame retardants, antistatic agents, dyes, pigments or fillers.

The polyetheramides can be isolated by suitable processes, as for example distillation, precipitation or extraction, and can then be transferred again to a suitable shaping solution using solvents of the amide type, possibly using the described additives in order to increase the solvent power. In this manner for example salt-free solutions of the polymers can be obtained. The direct processing of the condensation solution is preferred however.

In order to isolate the polyetheramide the solution can be mixed with a precipitating agent and the coagulated product can be filtered off. Typical precipitating agents are for example water, methanol, cycloaliphatic and aromatic compounds such as cyclohexane, toluene etc. Preferably isolation is carried out by comminution of the polymer solution with an excess of water in a granulator. The finely comminuted coagulated polymer particles facilitate the subsequent washing steps (removal of the salt formed during neutralization) and the drying of the product (avoidance of entrapments) after filtering off. Morever a subsequent comminution is unnecessary, since a flowable product is directly produced.

Apart from the solution condensation described, which is a readily accessible process, other conventional processes may be used as already mentioned, for the production of polyamides, as for example melt condensation, solid phase condensation or interfacial condensation. These processes also comprise in addition to the condensation optionally controlling the molecular weight, purification steps or washing steps and the addition of suitable additives.

The additives can moreover be added to the isolated polymer by thermoplastic processing.

The aromatic polyetheramides according to the invention are characterized as predominantly amorphous polymers with surprisingly high mechanical properties, in particular a high initial modulus and a high glass transition temperature. The intrinsic viscosity [η] is in the range 50 to 750 cm³/g, preferably 100 to 400 cm³/g. The glass transition temperatures are generally above 200° C., preferably above 220° C. and the melting points are in the range of 300° to 350° C. The initial modulus of wet-spun and stretched filaments reaches at least 5 N/tex, preferably 7 N/tex. In the case of unstretched films it is already above 1.5 GPa. This value can be significantly increased by stretching of the films, for example to above 6 GPa when stretched in the ratio of 1:3. The initial modulus of pressed sheets is above 3 GPa.

The processing of polyetheramides according to the invention is preferably carried out via the melt by conventional thermoplastic processing techniques. Press-molding, extrusion or injection molding produces moldings, filaments, wires or films.

When processing via the melt auxiliaries such as lubricants or melt stabilizers can be added. Introducing end groups, for example by means of the addition of monofunctional compounds described above is advantageous for achieving a high melt stability. It is also expedient to dry the polymers well before processing.

In particular cases the polymers can also be processed from the solution, preferably from the condensation solution of the low temperature solution process described. This process offers for example a simple possibility of producing filaments and thin films or can also be advantageous for particular applications such as the production of prepregs (via impregnation processes) or use as wire enamel.

The production of the shaped articles from the molding solution can be carried out by dry processes, wet processes or dry-wet processes and by spraying.

For example in the wet process the spinning solution is passed through a spinneret with several spinning apertures into a coagulation bath, the solution being solidified into filaments. In a variant of this process, the so-called dry-wet process, the filaments initially pass through an inert medium, preferably air or nitrogen, and only then enter the coagulation bath.

Pulp is produced for example by spraying the solutions into a suitable coagulation bath.

In order to form films by the casting process the filtered and degassed solution is applied in thin layers to substrate materials. Suitable substrate materials are inert polymer films, for example made from polyester, or metal belts, or also on the laboratory scale glass sheets. Preferred processing of the solutions is at temperatures of at least about 10° C. below the boiling point of the solvent used, particularly preferably at least about 30° C. below the boiling point. At too high temperatures there is the danger of the polymers decomposing; too low temperatures make the processing more difficult due to the high viscosities. It is advantageous, although not essential to give the cast films a preliminary drying, preferably to a solvent content in the film of between 5 and 90%. Suitable conditions are temperatures between room temperature and about 10° C. below the boiling point of the solvent used, in combination also with strong convection for example in circulating air ovens. Depending on the particular temperature and convection, times of between a few minutes and some days, preferably 2 to 30 minutes, are sufficient. The films can be released depending on the particular substrate material immediately or during coagulation or directly after coagulation. As an alternative to the casting process the filtered and degassed solutions may also be coagulated directly through suitable nozzles. Here, dry processes or dry-wet processes can be used, in the former coagulation being carried out directly, in the latter the preformed film passing through a zone with a non-coagulating medium, such as for example air. This zone can be between 5 and 400 mm, preferably between 10 and 100 mm.

Water, mixtures of water and organic solvents or pure organic solvents can be used as coagulation bath, in each particular case also with salt additives as required. The halide salts listed above from the first and second group of the periodic table are suitable for example as salt additive. Preferably the salt is used which is also used as solution aid for the production of the condensation solution. Calcium chloride is particularly preferred, it being possible to vary the concentration within wide ranges. It is desirable that the temperature is about 10° C. lower than the boiling point of the coagulation bath, preferably between room temperature and 90° C.

The coagulated filaments or films are subsequently washed, being fed for example via rollers through several successive washing baths. The prerequisite for achieving the properties is that the removal of the salt by washing should be as complete as possible. Aqueous baths are preferred, the temperatures then being between room temperature and 90° C., preferably up to 70° C. Normally it is considered advantageous to have several baths in series and a circulation (countercurrent) of the medium.

The drying is preferably carried out via rollers or by means of IR lamps at temperatures of between 100° and 400° C., advantageously but not necessarily, with temperature gradients and/or under nitrogen. The drying times are shorter, the higher the temperature. Final temperatures of 200°-300° C. are particularly advantageous for processing, so that short drying times are sufficient.

In the case of films, in addition to this, a heat treatment step at temperatures of between 200° and 400° C., preferably 200° and 300° C., optionally with the application of tension or under an atmosphere of nitrogen, is advantageous for achieving a high dimensional stability. In the production of stretched film the separate heat treatment step is not necessary.

For uniaxial or biaxial (subsequent or simultaneous) stretching, known methods can be used: apart from stretching dry moldings over hot surfaces, under IR lamps or other heat sources there is also the possibility of wet stretching moldings having a residual content of solvent and/or salt, also in solvent baths. In the former method there is an advantage in the relatively low minimum temperatures required in the region of 200°-300° C., preferably around 250° C. Stretching can be carried out here also under nitrogen. Combinations of wet stretching and dry stretching are also possible. The draw ratios are in the range 0.5 to 10 fold, preferably 2-5 fold (uniaxial). Relatively low draw ratios are sufficient according to the invention in order to achieve exceptionally high mechanical properties.

The polyetheramides according to the invention are suitable for the production of a large number of moldings such as bearing components, seals, closures, clips, electrical insulators, electrical plugs, housings for electrical components, body components in automobile construction, pistons, gearwheels, turbine blades, running wheels, filament guides, camshafts, brake linings, clutch disks, etc.

Filaments, fibers or pulp made from the polyetheramides according to the invention can for example be used as reinforcement materials for vulcanized rubber, thermoplastic plastics or heat curing resins, for the production of filter fabrics or as a light insulating material.

Films and paper are suitable as heat resistant insulating material, films in particular as substrate for flexible printed circuit boards and for use in the field of data processing.

A particular application, in which the high initial modulus is particularly advantageous, consists in the use as a thermoplastic high temperature matrix for composite materials. The polymers claimed are suitable in this case both in the form of solutions, the high solubility enabling salt-free solutions to be produced, and in the form of powder, filaments or films for the production of prepregs or hybrid fabrics.

The polyetheramides according to the invention or the moldings produced from them were tested in accordance with the following test methods:

Intrinsic viscosity $[\eta]$:

The intrinsic viscosity $[\eta]$ is defined by equation 1:

$$[\eta] = \lim_{c_2 \to 0} \frac{(\eta/\eta_1) - 1}{c_2} \qquad \text{Eqn. 1}$$

$\eta$ and $\eta_1$ denoting the viscosities of the solution and of the solvent respectively and $c_2$ denoting the concentration of the polymer. Measurements were made on samples in N-methylpyrrolidone at 25° C.

Viscosity $\eta_o$:

The viscosity $\eta_o$ was determined in a rotating viscometer (RV 100, supplied by Haake, Karlsruhe, Federal Republic of Germany), the value for the condensation solution at 90° C. extrapolated to zero shear rate being given.

Mechanical properties:

Ultimate tensile strength (TS), elongation at break (EB), yield stress (YS), elongation at yield stress (EYS) (see Tables 1 and 2), initial modulus (IM) and knot strength were tested using Instron tensometers at 23° C. and 50% relative humidity.

Moldings:

The mechanical properties of moldings were determined from sheets press-molded from powder (6 cm in diameter, about 1 mm in thickness) in conformity with DIN 53 455 using test pieces S3A in accordance with DIN 53 504.

Films:

In conformity with DIN 53 455 with test piece 5 (strip width 15 mm, clamping distance 50 mm and measuring speed 20 mm/min).

Filaments:

In conformity with DIN 53 834, part 1.

Thermal properties:

The thermal data such as glass transition temperature, softening point, melting point and decomposition point were determined by the methods of thermogravimetry (TGA: nitrogen, 3 K/min), differential thermal analysis (DSC: nitrogen, 10 K/min), thermo-mechanical analysis (TMA: TA-3000 system with the TMA 40 measuring head supplied by Mettler, Greifensee, Switzerland; nitrogen, 40 K/min, 5 mm clamping distance, about 0.25 cN/tex alternating load) and by means of torsional vibration tests (TVT: in conformity with DIN 53 445).

Electrical properties:

All values were determined at 23° C. and 50% relative humidity, in particular

Dielectric constant and loss factor in conformity with DIN 53 483

Resistance in conformity with DIN 53 482

Dielectric strength in conformity with DIN 53 481 at 50 Hz.

EXAMPLES

1) Aromatic polyetheramide made from 100 mol % of terephthaloyl dichloride (TPC) and 100 mol % of 2,2-bis(4'-aminophenoxyphenyl)propane (BAP)

164.21 g of BAP were dissolved under nitrogen in 2,193 g of N-methylpyrrolidone and 81.21 g of TPC were added at between 15° and 70° C. over about 60 minutes. The viscous and clear solution was subsequently stirred at 70° C. for a further 40 minutes approximately and then neutralized with 24.54 g of CaO (96% pure, i.e. in 5% excess) and subsequently stirred for a further 30 minutes at 70° C.

The solution contained 8.8% of polyetheramide and 1.9% of $CaCl_2$, the dissolved polyetheramide had an intrinsic viscosity $[\eta]$ of 417 cm$^3$/g and the condensation solution had a viscosity $\eta_o$ of 156 Pa.s at 90° C.

The solution was filtered and comminuted in a granulator with the addition of water. The precipitated polyetheramide was washed several times with water and then with acetone. The flowable polymer was dried at 130° C. under reduced pressure (50–80 mbar) under a slow stream of nitrogen.

The excellent solubility of the polyetheramide is shown in the determination of $[\eta]$ by the very small Huggins constant $K_H$. The value obtained in NMP at 25° C. of 0.34 for $K_H$ demonstrates the good solubility of the polymer.

Concerning the thermal stability of the polyetheramide, weight loss was only evident in the TGA at 400° C. and above. In DSC the glass transition temperature was 227° C., which with a difference in the specific heat capacity of 0.14 J/(g.K) indicates a high amorphous content. The heat of fusion, from the melt peak at 318° C. was correspondingly low at 15.8 J/g.

2) A condensation solution according to Example 1 was filtered, degassed and wet spun. For this purpose it was spun at 80° C. from a die with 50 apertures each 100 μm in diameter into a coagulation bath, comprising a solution at 60° C. of 35% strength NMP in water, with a speed of 16 m/min. The filaments obtained were drawn through several washing baths, a washer (about 20 wraps), via two drying godets (160° and 180° C.) and finally at 390° C. over a hot surface. The draw ratio here was 1:4.5.

The mechanical properties of the yarn with linear density 150 dtex were, in the untwisted state, ultimate tensile strength 18 cN/tex, elongation at break 5.5% and initial modulus 7.6 N/tex, and in the twisted state (245 turns/m) ultimate tensile strength 24 cN/tex and elongation at break 6.4%. The knot strength was 90–100%.

The temperature of the hot surfaces for stretching can be varied within wide limits, yarns with linear density 310 dtex having at 300° C. and at a draw ratio of 1:2.2 in the untwisted state an ultimate tensile strength of 14 cN/tex, an elongation at break of 4.6% and an initial modulus of 7.1 N/tex and at 410° C. at a linear density of 100 dtex and a draw ratio of 1:3.5 in the untwisted state an ultimate tensile strength of 21 cN/tex and an elongation at break of 6.9.

3) A condensation solution corresponding to Example 1 was filtered, degassed and cast into films. For this purpose it was spread with a doctor knife on glass sheets at 90° C. The cast films were subsequently predried for 48 hours at 90° C. then coagulated in water at 25° C., then washed for 20 minutes in running water and for 24 hours in demineralized water and then dried at 120° C. and 50 mbar for 48 hours under a slow stream of nitrogen.

The thickness of the films can, depending in each case on the thickness of the layer spread with the doctor knife, be adjusted to between 2 and 100 μm, the films being very transparent and almost colorless to slightly yellowish-gold.

The mechanical properties of an unstretched film (30 μm) are ultimate tensile strength 65 MPa, elonation at break 79% and initial modulus 1.7 GPa. The water absorption was 2.0% at 23° C. and 50% relative humidity.

The electrical properties were at a high level with a volume resistance of $9.6 \times 10^{16}$ Ω.cm, a dielectric constant of 4.4, a loss factor of $1.8 \times 10^{-2}$ and a dielectric strength of 223 kV/mm. Under TMA, the films softened at 240° C.

Stretching by a ratio of 1:3 at 300° C. increased the mechanical properties to ultimate tensile strength 430 MPa, elongation at break 10–15% and initial modulus 6.8 GPa.

4) A dried flowable powder ($[\eta]=372$ cm$^3$/g) produced in accordance with Example 1 was press-molded in a high temperature press into sheets 6 cm in diameter and 1 mm in thickness.

The influence of the press temperature on the mechanical properties in the range 320° to 350° C. is shown by Table 1, the pressing conditions being in each case 5 minutes at 2.5 t.

TABLE 1

| T/°C. | YS MPa | EYS % | TS MPa | EB % |
|---|---|---|---|---|
| 320 | 89.0 | 9.5 | 87.6 | 15.3 |
| 330 | 89.5 | 10.0 | 88.0 | 12.2 |
| 340 | 94.1 | 10.4 | 82.5 | 14.2 |
| 350 | 92.7 | 9.4 | 88.8 | 9.5 |

The initial modulus of a sheet press-molded at 320° C. was 3.6 GPa, and that of a sheet press-molded at 350° C. was 3.9 GPa.

5) Example 1 was repeated and the condensation was stopped upon achieving defined viscosities using 1.874 g of benzoyl chloride (corresponding to 3 mol %) and the molecular weight limited in this way. The powders obtained were press-molded into sheets as in Example 4.

The influence of molecular weight (intrinsic viscosity $[\eta]$) on the mechanical properties of sheets press-molded at 330° C. is shown in Table 2, the sheets in each case being pressed for 5 minutes at 2.5 t.

TABLE 2

| $[\eta]$ (cm$^3$/g) | YS MPa | EYS % | TS MPa | EB % |
|---|---|---|---|---|
| 333 | 88.3 | 10.4 | 105.9 | 24.9 |
| 282 | 87.5 | 10.8 | 91.4 | 25.0 |
| 275 | 87.5 | 10.5 | 86.0 | 27.0 |
| 241 | 88.0 | 10.7 | 87.3 | 19.3 |
| 213 | — | — | 87.9 | 8.9 |
| 151 | — | — | 76.7 | 4.7 |

In the TVT a correspondingly press-molded sheet of polyetheramide having $[\eta]=275$ cm$^3$/g had a glass transition temperature of 230° C.

6) The flowable and dried powder corresponding to Example 1 was formed into a wire through a 1 mm die with an extruder using a screw 20 mm in diameter and 420 mm in length at 53 rpm and a melt temperature of 375° C.

The mechanical properties of the unstretched wire having a linear density of 15,500 dtex were tensile strength 12 cN/tex and elongation at break 15%.

We claim:

1. A molded article of an aromatic polyetheramide, consisting essentially of the repeating units of the formulae —CO—Ar—CO—  (A)

and

—NH—Ar—O—Ar—X—Ar—O—Ar—NH— (B)

in which Ar signifies a bivalent unsubstituted or substituted aromatic radical having 6 carbon atoms, and having linkages in the p-position and X denotes a 2,2-propylidene linkage, wherein the polyetheramide has an intrinsic viscosity $[\eta]$ in the range of 50 to 750 cm$^3$/g measured in N-methylpyrrolidone at 25° C., a glass transition temperature of above 200° C. and a melting point in the range of 300° to 350° C.

2. An article as claimed in claim 1 wherein the intrinsic viscosity is in the range of 100 to 400 cm$^3$/g and the glass transition temperature is above 220° C.

3. An article as claimed in claim 1, wherein the aromatic radical Ar in the polyetheramide is substituted with up to 2 alkyl or alkoxy radicals having 1–4 carbon atoms in the alkyl radical or is substituted with halogen.

4. An article as claimed in claim 3, wherein the halogen is chlorine or bromine.

5. An article as claimed in claim 1 in the form of a filament, wire, film, pressed sheet or other molding.

6. An article as claimed in claim 5, having the following specific criteria a) to d):
 a) the initial modulus of stretched filaments is at least 55.5 g/denier;
 b) the initial modulus of unstretched films is above 215000 psi;
 c) the initial modulus of stretched films is above 870000 psi at a stretch ratio of 1:3; and
 d) the initial modules of pressed sheets is above 435000 psi.

* * * * *

UNITED STATES PATENT AND TRADEMARK OFFICE
CERTIFICATE OF CORRECTION

PATENT NO. : 5,039,779
DATED : August 13, 1991
INVENTOR(S) : Harald Cherdron, Hellmuth Deckers, Friedrich Herold and Reiner Hess.

It is certified that error appears in the above-identified patent and that said Letters Patent is hereby corrected as shown below:

Col. 7, line 6, the equation should read:

$$-- \quad [\eta] = \lim_{c_2 \to 0} \frac{(\eta/\eta_1)-1}{c_2} \qquad \underline{\text{Eqn.1}} \quad --.$$

In column 8, line 67, "elonation" should read --elongation--.

In claim 6, column 10, line 50, "modules" should read --modulus--.

Signed and Sealed this

Ninth Day of March, 1993

*Attest:*

STEPHEN G. KUNIN

*Attesting Officer*     *Acting Commissioner of Patents and Trademarks*

UNITED STATES PATENT AND TRADEMARK OFFICE
CERTIFICATE OF CORRECTION

PATENT NO. : 5,039,779
DATED : August 15, 1991
INVENTOR(S) : Harald Cherdron, et al It is certified that error appears in the above-identified patent and that said Letters Patent is hereby corrected as shown below:

In column 7, line 8, the equation should read:

$$[\eta] = \lim_{c_2 \to 0} \frac{(\eta/\eta_1) - 1}{c_2}$$

This certificate supersedes Certificate of Correction issued March 9, 1993.

Signed and Sealed this

Twenty-second Day of June, 1993

Attest:

MICHAEL K. KIRK

*Attesting Officer*     Acting Commissioner of Patents and Trademarks